United States Patent
Kojima et al.

(10) Patent No.: US 11,603,131 B2
(45) Date of Patent: Mar. 14, 2023

(54) CONTROL DEVICE AND TURNING DEVICE

(71) Applicant: JTEKT CORPORATION, Osaka (JP)

(72) Inventors: Takashi Kojima, Kashihara (JP); Yuji Kariatsumari, Kitakatsuragi-gun (JP)

(73) Assignee: JTEKT CORPORATION, Kariya (JP)

(*) Notice: Subject to any disclaimer, the term of this patent is extended or adjusted under 35 U.S.C. 154(b) by 159 days.

(21) Appl. No.: 16/901,134

(22) Filed: Jun. 15, 2020

(65) Prior Publication Data

US 2020/0391796 A1    Dec. 17, 2020

(30) Foreign Application Priority Data

Jun. 17, 2019 (JP) .............................. JP2019-111943

(51) Int. Cl.
  *B62D 15/02* (2006.01)
  *B62D 5/04* (2006.01)
  *G01C 21/36* (2006.01)

(52) U.S. Cl.
  CPC ........... *B62D 15/025* (2013.01); *B62D 5/046* (2013.01); *B62D 15/021* (2013.01); *G01C 21/36* (2013.01)

(58) Field of Classification Search
  CPC .... B62D 15/025; B62D 5/046; B62D 15/021; B62D 6/002; B62D 5/0418; B62D 6/003; B62D 6/00; G01C 21/36
  See application file for complete search history.

(56) References Cited

U.S. PATENT DOCUMENTS 3,715,572 A * 2/1973 Bennett ............... G05D 1/0272
                                                       318/587
4,817,433 A * 4/1989 Sato ..................... G01S 7/52074
                                                       73/620

(Continued)

FOREIGN PATENT DOCUMENTS

CA       3059863 A1 * 10/2018 ............ B60W 10/20
CN     101254796 A  *  9/2008 ........... B62D 5/0463

(Continued)

OTHER PUBLICATIONS

"Coordinated Chassis Control of 4WD Vehicles Utilizing Differential Braking, Traction Distribution and Active Front Steering;" Jianbo Feng, Sizhong Chen, Zhiquan Qi; IEEE Access (vol. 8, pp. 81055-81068); Jan. 1, 2020. (Year: 2020).*

(Continued)

*Primary Examiner* — Khoi H Tran
*Assistant Examiner* — Jorge O Peche
(74) *Attorney, Agent, or Firm* — Oliff PLC

(57) ABSTRACT

A control device includes a processor. The processor is configured to perform a route acquisition process for acquiring route information indicating a target route of a vehicle. The processor is configured to perform a behavior optimization process for correcting, based on at least one of a plurality of state quantities indicating a behavior of the vehicle during traveling, each of a left turning command value and a right turning command value such that the behavior of the vehicle becomes a target behavior. The processor is configured to perform a locus stabilization process for correcting, based on at least one of the state quantities indicating the behavior of the vehicle during traveling, a steering command value such that the vehicle travels on the target route.

4 Claims, 3 Drawing Sheets

(56) References Cited

U.S. PATENT DOCUMENTS

| | | | | |
|---|---|---|---|---|
| 4,840,389 A * | 6/1989 | Kawabe | B62D 7/159 | 701/41 |
| 4,884,202 A * | 11/1989 | Ogawa | G05D 1/0272 | 318/587 |
| 5,069,642 A * | 12/1991 | Henderson | B63H 20/007 | 114/144 R |
| 5,078,070 A * | 1/1992 | Clement | B63H 20/007 | 440/7 |
| 5,088,943 A * | 2/1992 | Henderson | B63H 20/007 | 440/6 |
| 5,108,322 A * | 4/1992 | Henderson | B63H 25/24 | 440/7 |
| 5,112,256 A * | 5/1992 | Clement | B63C 9/0011 | 440/58 |
| 5,129,845 A * | 7/1992 | Henderson | B63H 20/007 | 440/58 |
| 5,171,173 A * | 12/1992 | Henderson | B63H 20/007 | 440/7 |
| 5,212,641 A * | 5/1993 | Iwata | B62D 7/148 | 180/197 |
| 5,386,365 A * | 1/1995 | Nagaoka | B62D 7/159 | 701/44 |
| 5,646,853 A * | 7/1997 | Takahashi | G08G 1/08 | 348/149 |
| 5,900,704 A * | 5/1999 | Henninger | B62D 5/065 | 318/590 |
| 7,472,004 B2 * | 12/2008 | Hara | B62D 15/0215 | 180/443 |
| 8,149,031 B1 * | 4/2012 | Aslanzadeh | H03L 7/0816 | 327/147 |
| 9,079,499 B1 * | 7/2015 | Raubvogel | G01S 19/13 | |
| 11,214,301 B2 * | 1/2022 | Tsukahara | B62D 6/003 | |
| 2002/0198644 A1 * | 12/2002 | Obata | B62D 6/00 | 180/443 |
| 2003/0028304 A1 * | 2/2003 | Klein | G05B 9/02 | 180/443 |
| 2004/0251377 A1 * | 12/2004 | Dammar | B64C 39/00 | 244/17.11 |
| 2005/0000750 A1 * | 1/2005 | Ikeda | B62D 5/062 | 180/441 |
| 2005/0109556 A1 * | 5/2005 | Kubota | B62D 5/0463 | 701/41 |
| 2005/0149241 A1 * | 7/2005 | Fujioka | B62D 6/008 | 701/41 |
| 2005/0230180 A1 * | 10/2005 | Kodama | B62D 5/046 | 180/446 |
| 2006/0012323 A1 * | 1/2006 | Endo | B62D 5/0463 | 318/432 |
| 2006/0069481 A1 * | 3/2006 | Kubota | B62D 5/0463 | 701/41 |
| 2006/0229781 A1 * | 10/2006 | Nishimura | E05F 15/40 | 701/36 |
| 2007/0038340 A1 * | 2/2007 | Sekiguchi | B60L 50/60 | 701/22 |
| 2007/0043490 A1 * | 2/2007 | Yokota | B62D 5/0463 | 701/41 |
| 2008/0048591 A1 * | 2/2008 | Hamada | B62D 5/0496 | 318/9 |
| 2008/0249686 A1 | 10/2008 | Mikuriya et al. | | |
| 2009/0188226 A1 * | 7/2009 | Carlson | B62D 6/008 | 56/10.2 R |
| 2009/0294208 A1 * | 12/2009 | Nishimura | B62D 5/0493 | 180/446 |
| 2011/0031805 A1 * | 2/2011 | Yamashita | H02J 7/1438 | 307/9.1 |
| 2011/0054742 A1 * | 3/2011 | Yamashita | B62D 5/0463 | 701/41 |
| 2011/0057510 A1 * | 3/2011 | Yamashita | B62D 6/02 | 307/10.1 |
| 2011/0074320 A1 * | 3/2011 | Nakamura | H02P 21/06 | 318/400.02 |
| 2012/0143408 A1 * | 6/2012 | Hosokawa | B63H 25/04 | 701/21 |
| 2013/0233639 A1 * | 9/2013 | Kodato | B62D 5/0463 | 701/42 |
| 2013/0342148 A1 * | 12/2013 | Yanai | B62D 5/0487 | 318/472 |
| 2014/0200771 A1 * | 7/2014 | Yabuguchi | B62D 5/0493 | 701/41 |
| 2016/0185384 A1 * | 6/2016 | Kodera | B62D 5/0469 | 701/41 |
| 2017/0193384 A1 * | 7/2017 | Mudalige | G08G 1/161 | |
| 2017/0324363 A1 * | 11/2017 | Furukawa | H02P 27/06 | |
| 2018/0178841 A1 * | 6/2018 | Ikedo | B62D 15/0295 | |
| 2018/0186406 A1 * | 7/2018 | Itou | B62D 15/0285 | |
| 2018/0273089 A1 * | 9/2018 | Isomoto | G05D 1/0238 | |
| 2018/0281849 A1 * | 10/2018 | Irie | B62D 6/08 | |
| 2019/0193776 A1 * | 6/2019 | Tsubaki | B62D 15/0235 | |
| 2019/0225260 A1 * | 7/2019 | Tsubaki | B62D 6/002 | |
| 2019/0300044 A1 * | 10/2019 | Tsubaki | B62D 5/04 | |
| 2019/0315606 A1 * | 10/2019 | Ding | B66C 9/14 | |
| 2019/0324463 A1 * | 10/2019 | Zhu | B60W 10/20 | |
| 2019/0346287 A1 * | 11/2019 | Koike | G01D 5/245 | |
| 2020/0044338 A1 * | 2/2020 | Haziza | H04L 25/4902 | |
| 2020/0262478 A1 * | 8/2020 | Sato | B62D 15/026 | |
| 2020/0269904 A1 * | 8/2020 | Oda | B62D 15/021 | |
| 2020/0353974 A1 * | 11/2020 | Nakamura | B62D 5/0463 | |
| 2020/0391796 A1 * | 12/2020 | Kojima | B62D 15/021 | |
| 2021/0053617 A1 * | 2/2021 | Miura | B62D 6/04 | |
| 2021/0064030 A1 * | 3/2021 | Jiang | G08G 1/096877 | |
| 2021/0179140 A1 * | 6/2021 | Zhu | B60W 50/0205 | |
| 2021/0300411 A1 * | 9/2021 | Zhu | B60W 60/0025 | |
| 2021/0300463 A1 * | 9/2021 | Kodera | B62D 5/005 | |
| 2021/0316721 A1 * | 10/2021 | Lim | B62D 15/021 | |
| 2021/0354748 A1 * | 11/2021 | Kunihiro | B62D 5/0463 | |
| 2022/0105936 A1 * | 4/2022 | Watanabe | B60W 30/165 | |
| 2022/0192075 A1 * | 6/2022 | Kurata | B60C 23/00 | |
| 2022/0194469 A1 * | 6/2022 | Atmeh | B62D 15/021 | |
| 2022/0332306 A1 * | 10/2022 | Noma | B60W 10/00 | |

FOREIGN PATENT DOCUMENTS

| | | | | |
|---|---|---|---|---|
| CN | 112172917 A * | 1/2021 | | B60W 10/04 |
| CN | 112339854 A * | 2/2021 | | B62D 15/025 |
| CN | 113613984 A * | 11/2021 | | |
| DE | 102018102894 A1 * | 10/2018 | | B62D 15/025 |
| DE | 102019123158 A1 * | 5/2020 | | B60W 30/12 |
| DE | 112012007083 B4 * | 5/2021 | | B60G 17/0162 |
| EP | 2947532 B1 * | 7/2020 | | B62D 59/04 |
| EP | 3708464 A1 * | 9/2020 | | B60W 10/20 |
| EP | 3782877 A1 * | 2/2021 | | B62D 15/0235 |
| EP | 3822121 A1 * | 5/2021 | | B60Q 1/34 |
| EP | 3822122 A1 * | 5/2021 | | B60Q 1/34 |
| EP | 3971058 A1 * | 3/2022 | | B62D 5/0424 |
| EP | 4057099 A1 * | 9/2022 | | G05D 1/0214 |
| JP | 2006199264 A * | 8/2006 | | |
| JP | 2007056933 A * | 3/2007 | | |
| JP | 2007318941 A * | 12/2007 | | |
| JP | 2008-254630 A | 10/2008 | | |
| JP | 2009-208492 A | 9/2009 | | |
| JP | 2020027459 A * | 2/2020 | | |
| JP | 7119846 B2 * | 8/2022 | | |
| KR | 20220064445 A * | 5/2022 | | |
| WO | WO-2020138494 A1 * | 7/2020 | | |
| WO | WO-2020138495 A1 * | 7/2020 | | |
| WO | WO-2021132705 A1 * | 7/2021 | | |
| WO | WO-2021132706 A1 * | 7/2021 | | |
| WO | WO-2022044112 A1 * | 3/2022 | | B60Q 1/42 |
| WO | WO-2022153880 A1 * | 7/2022 | | |

OTHER PUBLICATIONS

"Development of an Electronic Stability Program Completed with Steering Intervention for Heavy Duty Vehicles;" P. Koleszar, B. Trencseni, L. Palkovics; Proceedings of the IEEE International Symposium on Industrial Electronics, 2005. ISIE 2005. (vol. 1, pp. 379-384); Jan. 1, 2005. (Year: 2005).*

(56) References Cited

OTHER PUBLICATIONS

Nov. 9, 2020 Extended European Search Report issued in European Patent Application No. 20180030.7.

* cited by examiner

CONTROL DEVICE AND TURNING DEVICE

CROSS-REFERENCE TO RELATED APPLICATION

This application claims priority to Japanese Patent Application No. 2019-111943 filed on Jun. 17, 2019, incorporated herein by reference in its entirety.

BACKGROUND

1. Technical Field

The present disclosure relates to a control device and a turning device for independently turning steered wheels disposed on the right and left of a vehicle.

2. Description of Related Art

There is a turning device for a vehicle in which a steering wheel and a turning mechanism are mechanically disconnected from each other. The turning device independently controls steered angles of steered wheels. For example, Japanese Unexamined Patent Application Publication No. 2009-208492 (JP 2009-208492 A) describes a technique that controls, when a driver's steering operation exceeds a limit, a driving force and the steered angles of the steered wheels to turn the vehicle in accordance with a driver's intention while maintaining a stable vehicle posture. In addition, Japanese Unexamined Patent Application Publication No. 2008-254630 (JP 2008-254630 A) describes a technique that, in a vehicle in which four wheels can be turned independently, changes a turning state depending on the vehicle speed to improve the stability of the vehicle and reduce load applied on the turning mechanism.

SUMMARY

However, when the steered angles of the right and left steered wheels are individually corrected when the vehicle is traveling on a curve for purposes such as to improve the marginal performance of the vehicle behavior and to suppress the energy loss of the steered wheels, the total sum of the tire lateral force changes. The inventors have found that the above effect causes fluctuation in the turning state of the vehicle, and the vehicle may thus deviate from a desired travel route while traveling.

The present disclosure provides a control device and a turning device that can individually correct steered angles of right and left steered wheels when a vehicle is traveling on a curve to adjust a behavior of the vehicle and cause the vehicle to travel in accordance with a target route.

A control device according to a first aspect of the present disclosure is configured to independently control a steered angle of each of a left steered wheel disposed on the left with respect to a traveling direction of a vehicle and a right steered wheel disposed on the right with respect to the traveling direction of the vehicle. The control device includes a processor. The processor is configured to perform a steered angle determination process for determining, based on a steering command value indicating a steering direction of the vehicle, a left turning command value indicating the steered angle of the left steered wheel and a right turning command value indicating the steered angle of the right steered wheel. The processor is configured to perform a route acquisition process for acquiring route information indicating a target route of the vehicle. The processor is configured to perform a behavior optimization process for correcting, based on at least one of a plurality of state quantities indicating a behavior of the vehicle during traveling, each of the left turning command value and the right turning command value such that the behavior of the vehicle becomes a target behavior. The processor is configured to perform a locus stabilization process for correcting, based on at least one of the state quantities indicating the behavior of the vehicle during traveling, the steering command value such that the vehicle travels on the target route.

In the control device according to the first aspect of the present disclosure, the processor may be configured to acquire the route information based on the steering command value. In the control device according to the first aspect of the present disclosure, the processor may be configured to acquire the route information from a traveling control device that is configured to control or assist travel of the vehicle. In the control device according to the first aspect of the present disclosure, the processor may be configured to perform, when the processor determines that the vehicle is in a predetermined state based on at least one of the state quantities indicating the behavior of the vehicle during traveling, a priority adjustment process that changes a control priority of the locus stabilization process with respect to a control priority of the behavior optimization process from the control priority of the locus stabilization process with respect to the control priority of the behavior optimization process when the vehicle is not in the predetermined state.

A turning device according to a second aspect of the present disclosure includes a left turning mechanism, a right turning mechanism, and a control device. The left turning mechanism has a left actuator configured to turn a left steered wheel disposed on the left with respect to a traveling direction of a vehicle. The right turning mechanism has a right actuator configured to turn a right steered wheel disposed on the right with respect to the traveling direction of the vehicle. The control device is configured to independently control a steered angle of each of the left steered wheel and the right steered wheel. The control device includes a processor. The processor is configured to perform a steered angle determination process for determining, based on a steering command value indicating a steering direction of the vehicle, a left turning command value indicating the steered angle of the left steered wheel and a right turning command value indicating the steered angle of the right steered wheel. The processor is configured to perform a route acquisition process for acquiring route information indicating a target route of the vehicle. The processor is configured to perform a behavior optimization process for correcting, based on at least one of a plurality of state quantities indicating a behavior of the vehicle during traveling, each of the left turning command value and the right turning command value such that the behavior of the vehicle becomes a target behavior. The processor is configured to perform a locus stabilization process for correcting, based on at least one of the state quantities indicating the behavior of the vehicle during traveling, the steering command value such that the vehicle travels on the target route.

According to the present disclosure, it is possible to independently control the right and left steered wheels to optimize the behavior of the vehicle, and to steer the vehicle such that the vehicle travels in accordance with the target route.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

Embodiments of a control device and a turning device according to the present disclosure will be described below with reference to the drawings. Numerical values, shapes, materials, components, positional relationships and connections of components, steps, order of steps, and the like described in the following embodiments are merely examples and are not intended to limit the applicable embodiment. A plurality of applicable embodiments may be described below as one embodiment. Components not described in the claims are described as optional components with respect to the present disclosure according to the corresponding claims. The drawings are schematic diagrams in which emphasis, omission, and scale adjustment are made as appropriate to illustrate the present disclosure, and may differ from actual shapes, positional relationships, and scales.

Figure 1:
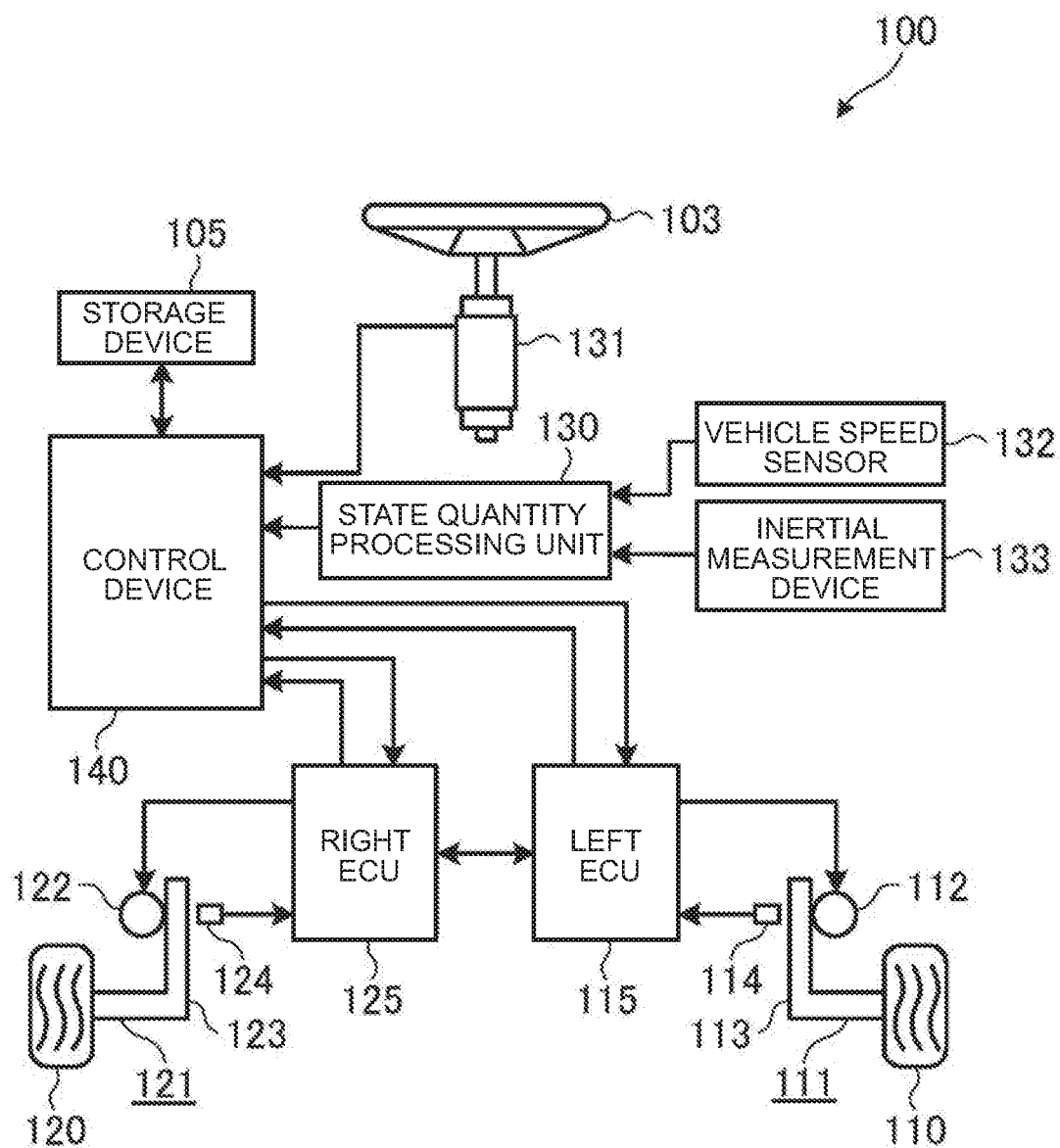
FIG. 1 is a diagram illustrating an overall configuration of a turning device according to an embodiment.

First, an overall configuration of a turning device 100 for a vehicle 101 according to the embodiment of the present disclosure will be described. FIG. 1 is a block diagram illustrating an overall configuration of a turning device according to the embodiment. The turning device 100 is a device that can independently turn a left steered wheel 110 and a right steered wheel 120 that are mounted on the vehicle 101 such as a passenger vehicle and that are not connected to each other by a mechanical element such as a link. In the present embodiment, the turning device 100 constitutes a linkless steer-by-wire system that can turn right and left steered wheels based on a signal output by steering a steering member 103. The turning device 100 includes the steering member 103 serving as a steering member operated by a driver for steering, the left steered wheel 110 and the right steered wheel 120 disposed on the front side of the vehicle 101 in a traveling direction, a left turning mechanism 111 for individually turning the left steered wheel 110, and a right turning mechanism 121 for individually turning the right steered wheel 120.

The left turning mechanism 111 and the right turning mechanism 121 respectively include a left actuator 112 and a right actuator 122 that are controlled in accordance with a rotation operation of the steering member 103. In the present embodiment, the left actuator 112 and the right actuator 122 are electric motors.

The left turning mechanism 111 has a left turning structure 113 for turning the left steered wheel 110. The right turning mechanism 121 has a right turning structure 123 for turning the right steered wheel 120. The left turning structure 113 and the right turning structure 123 are supported by a suspension with respect to the vehicle body. The left turning structure 113 turns the left steered wheel 110 with a rotational driving force received from the left actuator 112. The right turning structure 123 turns the right steered wheel 120 with a rotational driving force received from the right actuator 122.

The turning device 100 further includes a steering angle sensor 131 that detects a steering angle of the steering member 103. Here, the steering angle sensor 131 detects a rotation angle and an angular velocity of a rotation shaft of the steering member 103 and outputs the detected rotation angle and angular velocity as a steering command value S. The turning device 100 includes a left sensor 114 that detects a steered angle of the left steered wheel 110 and a right sensor 124 that detects a steered angle of the right steered wheel 120.

The vehicle 101 is further provided with a vehicle speed sensor 132 for detecting a speed V of the vehicle 101 and an inertial measurement device 133. The inertial measurement device 133 includes, for example, a gyro sensor, an acceleration sensor, a geomagnetic sensor, and the like. The inertial measurement device 133 detects the acceleration, angular velocity, and the like of the vehicle 101 in three axial directions. Examples of the three axial directions regarding the angular velocity are a yawing direction, a pitching direction, and a rolling direction. The inertial measurement device 133 detects, for example, the angular velocity in the yawing direction (also referred to as "yaw rate"). The inertial measurement device 133 may also detect the angular velocity in the pitching direction and the rolling direction.

The vehicle speed sensor 132, the inertial measurement device 133, and the like are connected to a state quantity processing unit 130. The state quantity processing unit 130 outputs information received from various sensors to a control device 140 as state quantities Q. The state quantity processing unit 130 may generate the state quantities Q indicating a behavior of the vehicle 101 by calculating information received from the various sensors and output the generated state quantities Q to the control device 140.

The turning device 100 includes the control device 140 and a storage device 105. The storage device 105 may be provided separately from the control device 140, may be electrically connected to the control device 140, or may be included in the control device 140. The left turning mechanism 111 includes a left electronic control unit (ECU) 115, and the right turning mechanism 121 includes a right ECU 125. The control device 140 is electrically connected to the left ECU 115, the right ECU 125, the steering angle sensor 131, the vehicle speed sensor 132, and the inertial measurement device 133. The left ECU 115 is electrically connected to the control device 140, the left sensor 114, the left actuator 112, and the right ECU 125. The right ECU 125 is electrically connected to the control device 140, the right sensor 124, the right actuator 122, and the left ECU 115. Communication between the control device 140, the left ECU 115, the right ECU 125, the left actuator 112, the right actuator 122, the state quantity processing unit 130, and each sensor may be performed via an on-vehicle network such as controller area network (CAN).

The control device 140 performs feedback control based on information acquired from the steering angle sensor 131, the vehicle speed sensor 132, the inertial measurement device 133, the left ECU 115, and the right ECU 125, and outputs an appropriate left turning command value $\theta_L$ to the left ECU 115 and an appropriate right turning command value $\theta_R$ to the right ECU 125.

The storage device 105 can store various types of information, and can also retrieve and output the stored information. The storage device 105 is implemented by a storage unit such as a hard disk drive, a solid state drive (SSD), and a semiconductor memory such as a read-only memory (ROM), a random access memory (RAM), and a flash memory.

The control device 140, the left ECU 115, and the right ECU 125 may be constituted by a microcomputer including a processor such as a central processing unit (CPU) or a digital signal processor (DSP), and a memory. The memory may be a volatile memory such as the RAM, a non-volatile memory such as the ROM, or the storage device 105. Some or all of the functions of the control device 140, the state quantity processing unit 130, the left ECU 115, and the right ECU 125 may be implemented by the CPU that executes a program stored in the ROM using the RAM as a working memory.

Figure 2:
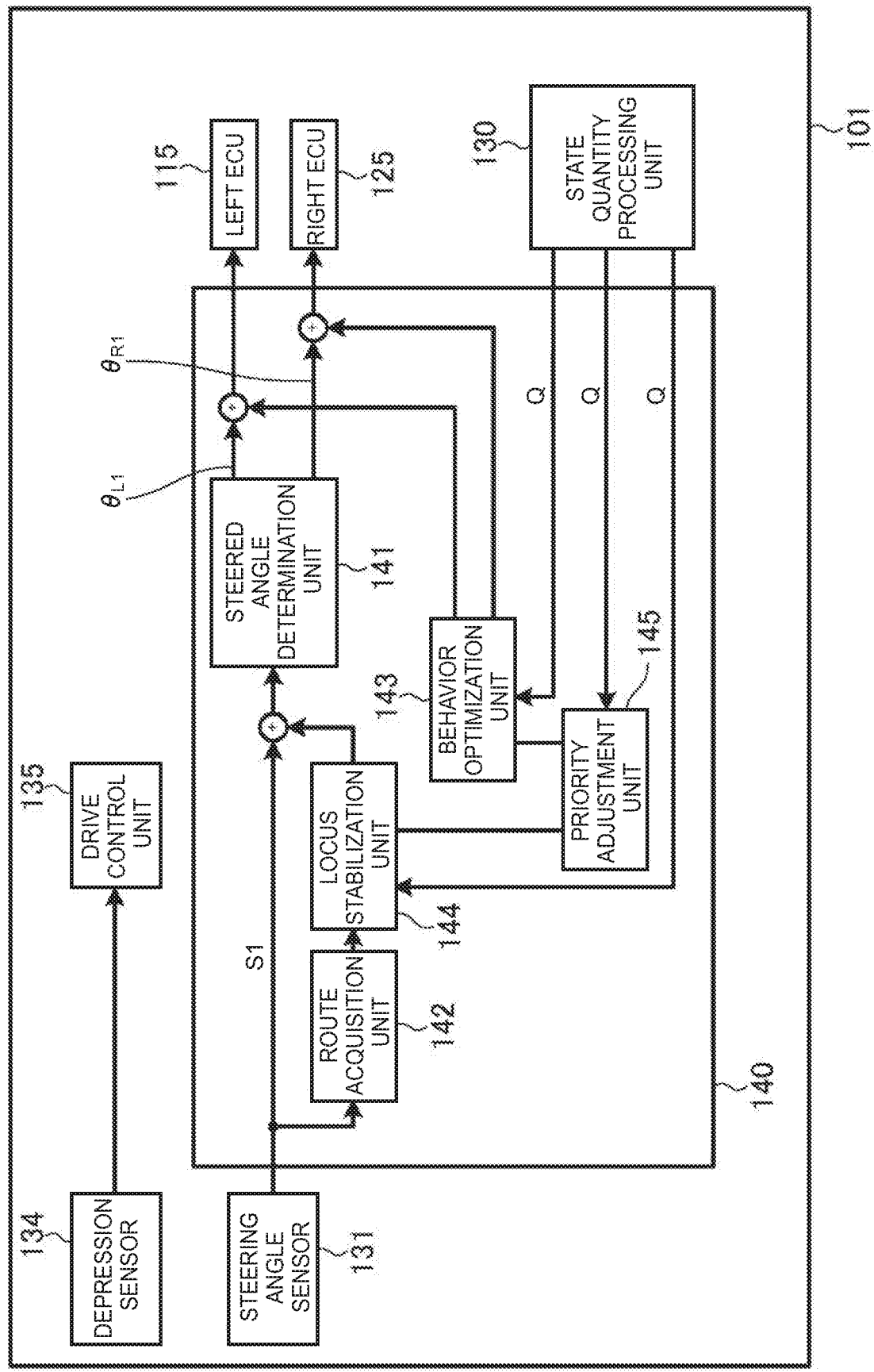
FIG. 2 is a block diagram illustrating a functional configuration of a control device according to the embodiment together with each component of a vehicle.

Next, details of the control device 140 will be described. FIG. 2 is a block diagram illustrating a functional configuration of the control device 140. The control device 140 is a device that independently controls the steered angles of the right steered wheel 120 and the left steered wheel 110 disposed on the right and left with respect to the traveling direction of the vehicle 101. The control device 140 includes a steered angle determination unit 141 for executing a steered angle determination process, a route acquisition unit 142 for executing a route acquisition process, a behavior optimization unit 143 for executing a behavior optimization process, and a locus stabilization unit 144 for executing a locus stabilization process. In the present embodiment, the control device 140 includes a priority adjustment unit 145 for executing a priority adjustment process. Vehicle speed control of the vehicle 101 is executed by a drive control unit 135 that controls an engine, a motor, and the like based on information from a depression sensor 134 attached to an accelerator pedal and the like for detecting a depression amount of the pedal.

The steered angle determination unit 141 calculates a left turning command value indicating a steered angle of the left steered wheel 110 and a right turning command value indicating a steered angle of the right steered wheel 120 based on the steering command value indicating the steering direction of the vehicle 101. In the present embodiment, the steered angle determination unit 141 acquires the rotation angle of the rotating shaft of the steering member 103 from the steering angle sensor 131 as the steering command value S1, and performs calculation using an inner wheel steered angle and an outer wheel steered angle based on a so-called overall steering gear ratio that is a predetermined ratio and the Ackermann-Jeantaud theory, and outputs a left turning command value $\theta_{L1}$ and a right turning command value $\theta_{R1}$.

The left ECU 115 drives the left actuator 112 in accordance with the acquired left turning command value $\theta_{L1}$ to turn the left steered wheel 110. The right ECU 125 drives the right actuator 122 in accordance with the acquired right turning command value $\theta_{R1}$ to turn the right steered wheel 120.

The route acquisition unit 142 acquires route information indicating a target route of the vehicle 101. In the present embodiment, since the vehicle 101 is steered based only on the driver's steering operation of the steering member 103, the route acquisition unit 142 acquires information from the steering angle sensor 131 as the route information. The route acquisition unit 142 may generate route information by performing calculations based on the information from the steering angle sensor 131, for example, the rotation angle and angular velocity of the steering member 103. Also in this case, the generated route information is included in the acquired route information. Further, the route information may be acquired by adding the vehicle speed.

The behavior optimization unit 143 corrects the left turning command value $\theta_{L1}$ and the right turning command value $\theta_{R1}$ so that the behavior of the vehicle 101 becomes a target behavior based on at least one of the plurality of state quantities Q indicating the behavior of the vehicle 101 during traveling. The target behavior of the behavior optimization unit 143 is not particularly limited. For example, the target may be set to improve the driver's sense of security and occupants' comfort by slightly correcting the right and left steered angles depending on whether the vehicle 101 is traveling at a low speed or the vehicle 101 is traveling at a high speed. Alternatively, the target may be set to suppress the energy loss caused by the steered wheels as much as possible to improve the fuel efficiency of the vehicle 101 as a whole, or the target may be set to improve the marginal performances of the vehicle 101 regarding slip angles and turning control by controlling the tire lateral force using the steered angles of the steered wheels.

The state quantity Q used by the behavior optimization unit 143 for the calculation is information acquired from the state quantity processing unit 130, and is, for example, the yaw rate, the vehicle speed, the acceleration in the traveling direction, the acceleration in the right and left direction, the actual steered angle of the left steered wheel 110, the actual steered angle of the right steered wheel 120 and the like that are acquired from the vehicle speed sensor 132, the inertial measurement device 133, the left sensor 114, and the right sensor 124 of the vehicle 101 and the like. The behavior optimization unit 143 may acquire the state quantity Q generated by the state quantity processing unit 130 based on information acquired from various sensors through calculations based on a known theory or the like. For example, the state quantity processing unit 130 may estimate the state quantity Q such as a vehicle body slip angle, a tire slip angle, and a tire vertical load, and the behavior optimization unit 143 may correct the right and left turning command values based on the estimated state quantity Q.

The locus stabilization unit 144 corrects the steering command value S1 based on at least one of the state quantities Q indicating the behavior of the vehicle 101 during traveling so that the vehicle 101 travels on the target route acquired by the route acquisition unit 142. With the right and left turning command values corrected by the behavior optimization unit 143, the steered angles of the right and left steered wheels change individually. Since the total sum of the generated tire lateral force changes due to this change and the traveling locus (turning locus) of the vehicle 101 on the curve fluctuates, the locus stabilization unit 144 corrects the steering command value S1. For example, the locus stabilization unit 144 derives a target yaw rate from the target route and the state quantity Q acquired from the state quantity processing unit 130, and corrects the steering command value S1 so as to maintain the target yaw rate. Further, the locus stabilization unit 144 derives a target curvature at the time of turning (a reciprocal of the turning radius) from the target route and the state quantity Q, and corrects the steering command value S1 so as to maintain the target curvature.

When the priority adjustment unit 145 determines that the vehicle 101 is in a predetermined state based on at least one of the state quantities Q indicating the behavior of the vehicle 101 during traveling, the priority adjustment unit 145 changes the control priority of the locus stabilization unit 144 with respect to the control priority of the behavior optimization unit 143 from that when the vehicle 101 is not in the predetermined state. Thus, the priority adjustment unit 145 adjusts control priorities of the behavior optimization unit 143 that individually performs feedback correction on the left turning command value $\theta_{L1}$ and the right turning command value $\theta_{R1}$ based on the state quantity Q acquired from the state quantity processing unit 130 and the locus stabilization unit 144 that performs feedback correction on the steering command value S1 for generating the left turning command value $\theta_{L1}$ and the right turning command value $\theta_{R1}$ based on the same state quantity Q acquired from the state quantity processing unit 130, to implement smooth control without causing vibration or the like.

The priority adjustment of the priority adjustment unit 145 is performed by, for example, changing each time constant of the behavior optimization unit 143 and the locus stabilization unit 144. Specifically, for example, the priority adjustment unit 145 can make the time constant different by adjusting at least one of the control cycle and the control gain of the behavior optimization unit 143 and the locus stabilization unit 144.

In the present embodiment, the predetermined state is assumed to be a limit state of the vehicle 101. When the priority adjustment unit 145 determines that the vehicle 101 is in the limit state based on the yaw rate, the vehicle speed, and the like, the priority adjustment unit 145 shortens the control cycle of the behavior optimization unit 143 from that during normal traveling to increase the control priority of the behavior optimization unit 143, and lengthens the control cycle of the locus stabilization unit 144 from that during normal traveling to reduce the control priority of the locus stabilization unit 144. Specifically, for example, the priority adjustment unit 145 changes the lengths of the control cycles of the behavior optimization unit 143 and the locus stabilization unit 144 so that the ratio of the control cycle of the locus stabilization unit 144 with respect to the control cycle of the behavior optimization unit 143 during normal traveling is reversed when the vehicle 101 is in the limit state. Alternatively, the priority adjustment unit 145 may set the control cycle of the behavior optimization unit 143 shorter than that during normal traveling and set the control cycle of the locus stabilization unit 144 longer than that during normal traveling, so that the ratio of the control cycle of the locus stabilization unit 144 with respect to the control cycle of the behavior optimization unit 143 during normal traveling is not reversed even in the limit state. Note that the control gain (for example, at least one of the gains in proportional-integral-derivative (PID) control) may be adjusted instead of the control cycle.

In the present embodiment, the following two types of feedback control are executed independently: individual correction of the right and left turning command values instructing the right and left steered angles based on the state quantities Q that represent the behavior of the vehicle 101 such as the tire lateral force; and correction of the steering command value S1 used for determining the right and left steering command values based on the state quantities Q. Therefore, for example, it is possible to steer the vehicle 101 with a so-called on-rails feeling such that the vehicle 101 is steered in accordance with the travel route in response to the steering operation of the steering member 103 while maintaining the behavior of the vehicle 101 to have a small energy loss.

Further, when the vehicle 101 is in a limit state such as when the state of the road surface suddenly changes, the vehicle 101 can be controlled smoothly without exceeding the limit state by adjusting the control priorities of the behavior optimization unit 143 and the locus stabilization unit 144.

The applicable embodiment is not limited to the above embodiment. For example, other embodiments implemented by combining components described in the specification as desired or by eliminating one or more of the components may be used as the embodiment of the present disclosure. Modifications of the embodiments obtained by making various modifications that may occur to those skilled in the art without departing from the scope of the present disclosure, that is, the scope defined by the wording of the claims, are also encompassed in the present disclosure.

Figure 3:
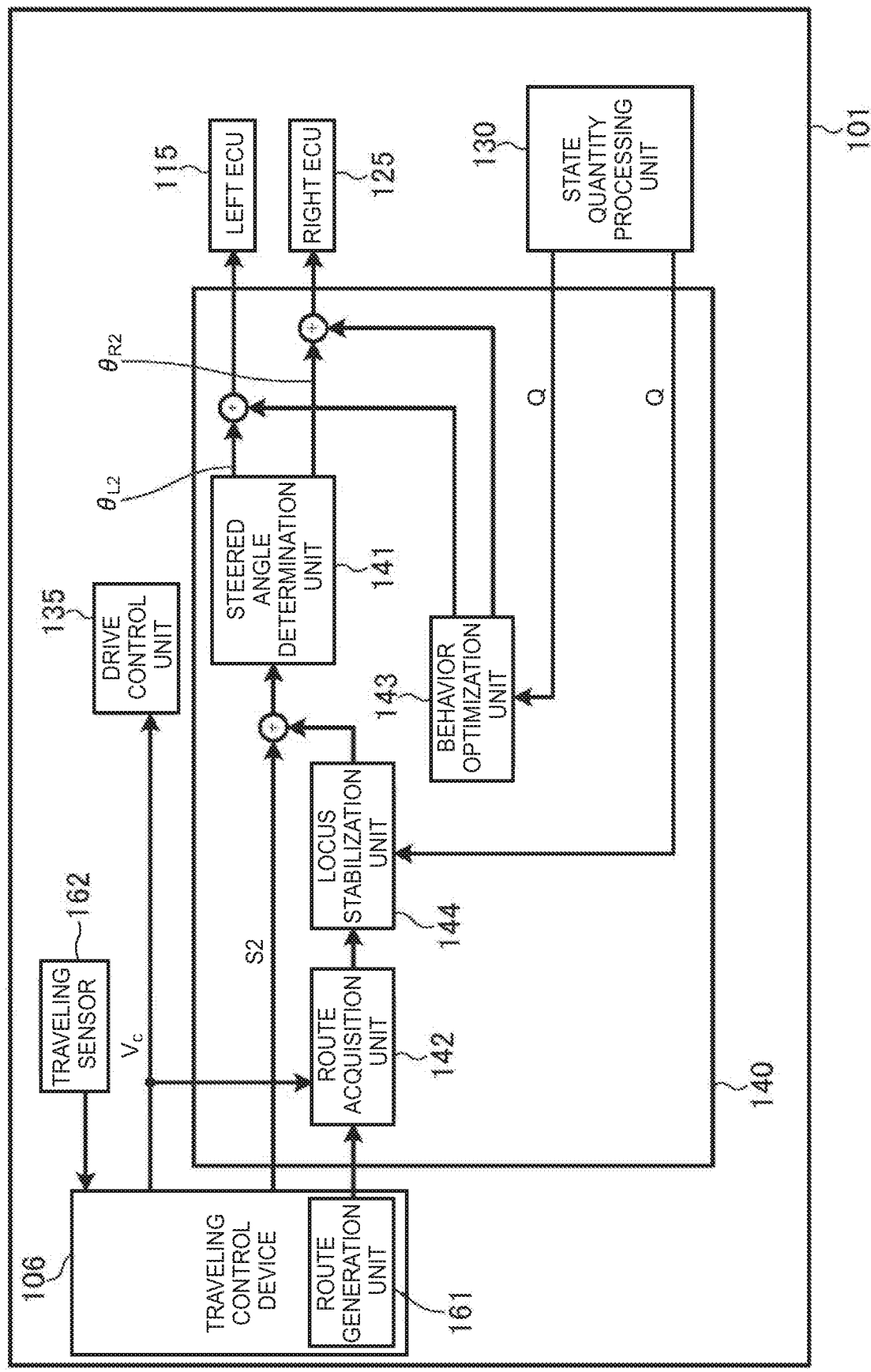
FIG. 3 is a block diagram illustrating a functional configuration of a control device according to another example together with each component of a vehicle.

For example, vehicle 101 may have functions such as an assist mode that allows the steering operation of the vehicle 101 via the steering member 103 to be assisted, and an automated driving mode that allows automated driving without using the steering member 103. In this case, as shown in FIG. 3, the vehicle 101 includes a traveling sensor 162 that enables functions such as automated driving, and a traveling control device 106 that controls or assists traveling of the vehicle 101 based on information from the traveling sensor 162.

The traveling sensor 162 is a sensor that acquires information necessary for automated traveling of the vehicle 101. The traveling sensor 162 is not particularly limited, and may include a plurality of types of sensors. Examples of the traveling sensor 162 include a camera that acquires information for generating a travel route such as a positions of marks including a white line provided on a road surface, a sensor that acquires the position of the vehicle 101 in map information, and a radar for detecting an obstacle in front of the vehicle 101.

The traveling control device 106 controls the traveling of the vehicle 101 based on information from the traveling sensor 162 and the like. The traveling control device 106 determines a target vehicle speed of the vehicle 101 and outputs a vehicle speed command value $V_C$ corresponding to the target vehicle speed to the drive control unit 135. The traveling control device 106 further includes a route generation unit 161. The route generation unit 161 generates a route on which the vehicle 101 should travel based on the map information and the information from the traveling sensor 162, and outputs the route as route information. The traveling control device 106 outputs a steering command value S2 based on the current position of the vehicle 101, the route information generated by the route generation unit 161 and the like.

In the assist mode and the automated driving mode and the like, the steered angle determination unit 141 of the control device 140 generates a left turning command value $\theta_{L2}$ and a right turning command value $\theta_{R2}$ based on the steering command value S2 output from the traveling control device 106. The behavior optimization unit 143 corrects the left turning command value $\theta_{L2}$ and the right turning command value $\theta_{R2}$ based on the state quantity Q regardless of whether the vehicle 101 is in the assist mode or the automated driving mode. The route acquisition unit 142 adds the vehicle speed command value $V_C$ output from the traveling control device 106 to the route information acquired from the route generation unit 161, and outputs the route information. The locus stabilization unit 144 corrects the steering command value S2 based on the acquired route information.

In FIG. 3, there is no priority adjustment unit 145 that relatively adjusts the control priorities of the locus stabilization unit 144 and the behavior optimization unit 143. In such a case, at least one of the locus stabilization unit 144 and the behavior optimization unit 143 may adjust the control priorities based on the state quantities Q.

The technique of the present disclosure may be implemented by a storage medium such as a system, an apparatus, a method, an integrated circuit, a computer program, and a computer-readable storage disk, and may be implemented by a desired combination of the system, the apparatus, the method, the integrated circuit, the computer program, and the storage medium.

For example, each processing unit included in the above embodiments is typically implemented by a large-scale integration (LSI) circuit that is an integrated circuit. The processing units may be individually integrated into one chip, or may be integrated into one chip that includes some or all of the processing units.

The integrated circuit is not limited to the LSI circuit, and may be implemented by a dedicated circuit or a general-purpose processor. A field-programmable gate array (FPGA) that can be programmed after manufacture of the LSI circuit, or a reconfigurable processor that can reconfigure the connections and settings of circuit cells inside the LSI circuit may be used.

In the above embodiments, each component may be constituted by a dedicated hardware, or may be implemented by executing a software program suitable for each component. Each component may be implemented by a program execution unit of a processor or the like such as a CPU that reads and executes a software program stored in a storage medium such as a hard disk or a semiconductor memory.

A part or all of the above components may be constituted by a removable integrated circuit (IC) card or a single module. The IC card or the module is a computer system constituted by a microprocessor, a ROM, a RAM, and the like. The IC card or the module may include the above-described LSI circuit or a system LSI circuit. The IC card or the module implements its functions by a microprocessor that operates in accordance with a computer program. The IC card and the module may have tamper resistance.

The technique related to the present disclosure is useful for a turning device in which a mechanism for turning each steered wheel is independently provided.

What is claimed is:

1. A control device configured to independently control a steered angle of each of a left steered wheel disposed on the left with respect to a traveling direction of a vehicle and a right steered wheel disposed on the right with respect to the traveling direction of the vehicle, the control device comprising a processor configured to perform:
    a route acquisition process for acquiring route information indicating a target route of the vehicle;
    a locus stabilization process for correcting, based on at least one of a plurality of state quantities indicating a behavior of the vehicle during traveling, a steering command value indicating a steering direction of the vehicle such that the vehicle travels on the target route;
    a steered angle determination process for determining, based on the corrected steering command value, a left turning command value indicating the steered angle of the left steered wheel and a right turning command value indicating the steered angle of the right steered wheel; and
    a behavior optimization process for correcting, based on the at least one of the plurality of state quantities, each of the left turning command value and the right turning command value such that the behavior of the vehicle becomes a target behavior.

2. The control device according to claim 1, wherein the processor is configured to acquire the route information from a traveling control device that is configured to control or assist travel of the vehicle.

3. The control device according to claim 1, wherein the processor is configured to perform, when the processor determines that the vehicle is in a predetermined state based on at least one of the state quantities, a priority adjustment process that changes a time constant of the locus stabilization process relative to a time constant of the behavior optimization process.

4. A turning device, comprising:
    a left turning mechanism having a left actuator configured to turn a left steered wheel disposed on a left side with respect to a traveling direction of a vehicle;
    a right turning mechanism having a right actuator configured to turn a right steered wheel disposed on a right side with respect to the traveling direction of the vehicle; and
    a control device configured to independently control a steered angle of each of the left steered wheel and the right steered wheel, the control device including a processor, the processor being configured to perform:
        a route acquisition process for acquiring route information indicating a target route of the vehicle;
        a locus stabilization process for correcting, based on at least one of a plurality of state quantities indicating a behavior of the vehicle during traveling, a steering command value indicating a steering direction of the vehicle such that the vehicle travels on the target route;
        a steered angle determination process for determining, based on the corrected steering command value, a left turning command value indicating the steered angle of the left steered wheel and a right turning command value indicating the steered angle of the right steered wheel;
        a behavior optimization process for correcting, based on the at least one of the plurality of state quantities, each of the left turning command value and the right turning command value such that the behavior of the vehicle becomes a target behavior.

* * * * *